United States Patent [19]

Tsujii et al.

[11] Patent Number: 5,053,599
[45] Date of Patent: Oct. 1, 1991

[54] WELDING GUN ASSEMBLY WITH TRANSFORMERS

[75] Inventors: Gen Tsujii; Fumitomo Takano, both of Sayama, Japan

[73] Assignee: Honda Giken Kogyo Kabushiki Kaisha, Tokyo, Japan

[21] Appl. No.: 523,113

[22] Filed: May 14, 1990

[30] Foreign Application Priority Data

May 15, 1989 [JP] Japan .................................. 1-121832

[51] Int. Cl.$^5$ ................................................ B23K 11/24
[52] U.S. Cl. .................................... 219/116; 219/108
[58] Field of Search ................................ 219/116, 108

[56] References Cited

U.S. PATENT DOCUMENTS

| 2,601,240 | 6/1952 | Blair | 219/116 |
|---|---|---|---|
| 2,719,946 | 10/1955 | Riley | 219/116 |
| 3,460,022 | 8/1969 | Riley | 219/116 |
| 3,495,067 | 2/1970 | Sciaky | 219/116 |
| 3,840,720 | 10/1974 | Wolf | 219/116 |
| 4,571,669 | 2/1986 | Tsujii et al. | 219/116 |
| 4,682,000 | 7/1987 | Holt et al. | 219/116 |
| 4,943,904 | 7/1990 | Van Antwerp et al. | 219/116 |

FOREIGN PATENT DOCUMENTS 1120598  7/1968  United Kingdom .

Primary Examiner—Clifford C. Shaw

[57] ABSTRACT

A welding gun assembly includes a welding gun with a pair of electrodes for welding workpieces together therebetween. The welding gun assembly includes an array of transformers extending in one direction and having respective secondary coils. The welding gun assembly also has a plurality of terminal plates connected to the secondary coils, and a plurality of center tap terminal plates connected to intermediate portions of the secondary coils. A first conductor plate extends along the transformer array and interconnects the terminal plates, the first conductor plate being connected to one of the electrodes of the welding gun. A second conductor plate extends along the transformer array and interconnects the center tap terminal plates, the second conductor plate being connected to the other electrodes of the welding gun.

10 Claims, 11 Drawing Sheets

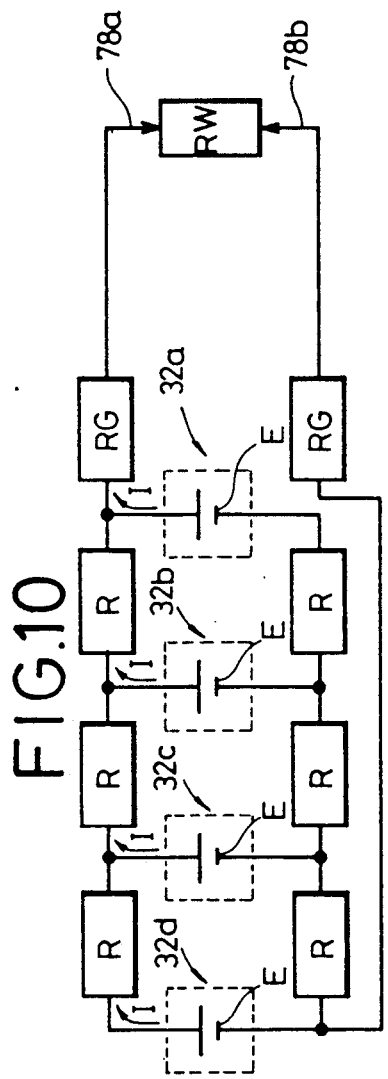
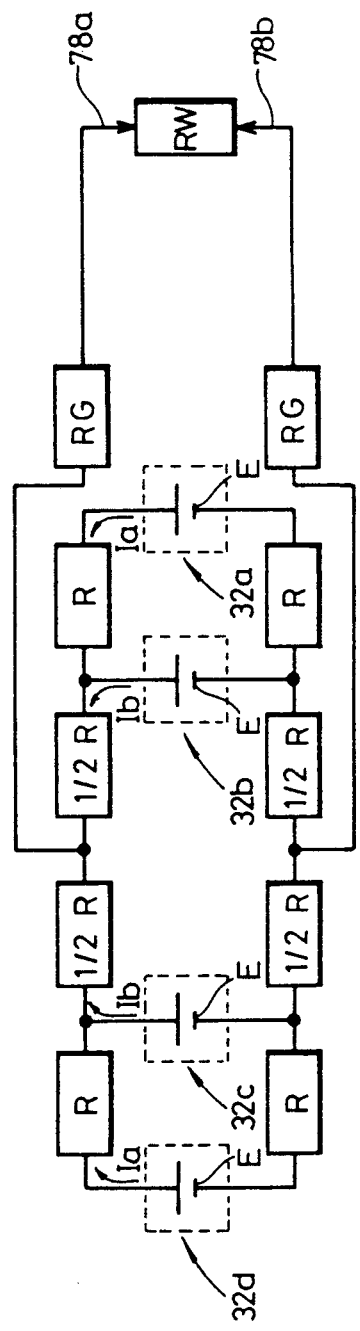

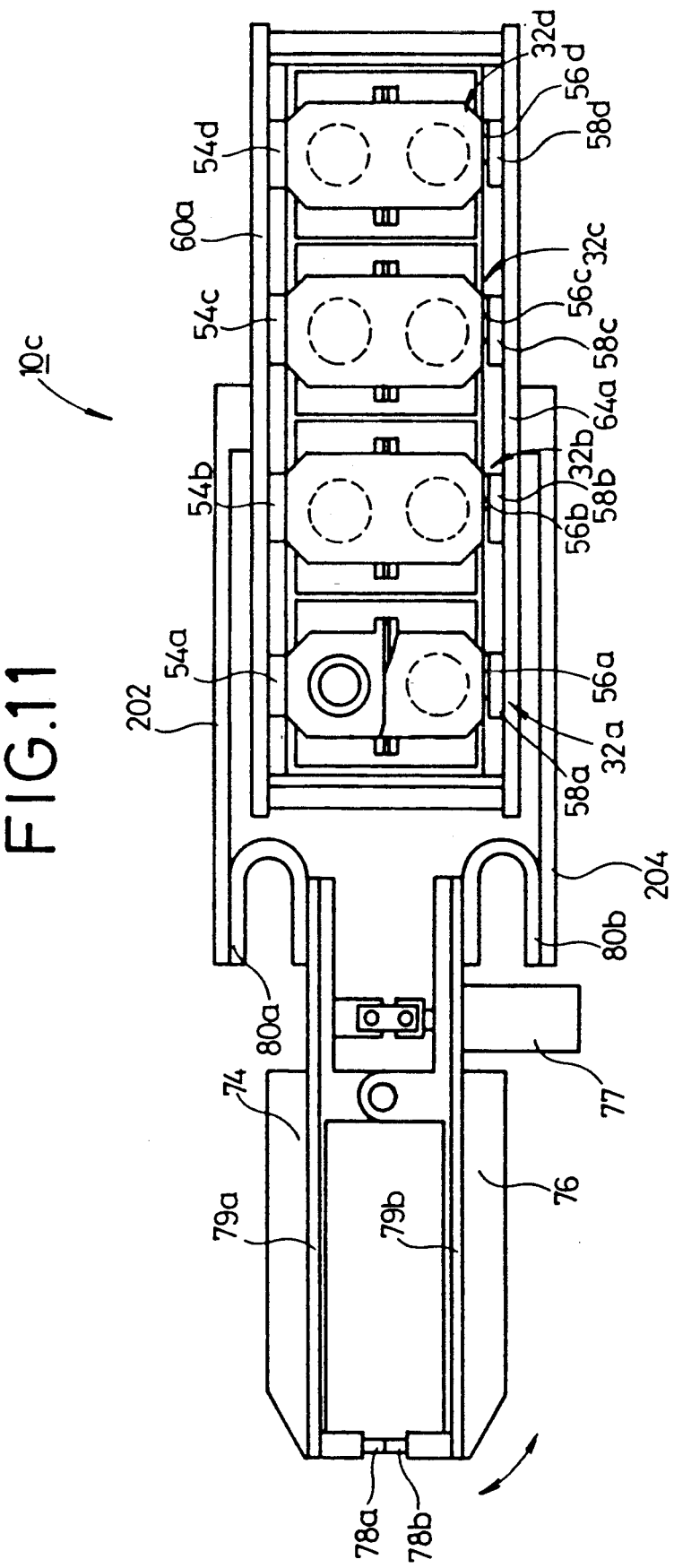

WELDING GUN ASSEMBLY WITH TRANSFORMERS

BACKGROUND OF THE INVENTION

1. Field of the Invention

The present invention relates to a welding gun assembly which includes an array of transformers having secondary coils and center tap terminal plates, and electrodes connected to the secondary coils and the center tap terminal plates.

2. Description of Background Art

Heretofore, many resistance welding apparatus incorporate a transformer unit which comprises a transformer having a secondary coil across which a welding gun is connected. More specifically, first and second are connected to the terminal plate and center tap terminal plate of the transformer, and a welding gun is connected to the other ends of the conductors.

An inverter-type resistance welding apparatus has a switching device, such as a power transistor, connected to the primary side of a transformer, and a diode connected to the secondary side of the transformer. Because of the limited capacity of the power transistor or the diode, there is a certain limitation on the current which can be supplied to a welding gun connected to the transformer. If thicker plates or plated steel plates which require a relative large welding current are to be welded, then it is desirable that a plurality of transformers be connected to provide a greater welding current capacity.

Attempts have been made to design a greater-capacity, smaller-size resistance welding apparatus in which a plurality of transformers are closely arranged in a vertical or horizontal matrix, and the terminal plates and center terminal plates of each of the transformers are connected to first and second conductors that are coupled to a welding gun.

Such a welding gun with plural transformers is suitable for use with a robot for automatic welding operation, but may not easily be manually handled directly by the operator for a welding process. More specifically, the welding gun is rotatably disposed in a tubular holder which is movably suspended by a chain in a factory or shop, and the holder is operated on directly by the operator during a welding operation. However, since the transformers are arranged in a vertical or horizontal matrix, as described above, the holder which houses the transformer matrix has a large diameter. As a result, the holder is large in size, and cannot easily be handled by the operator. The efficiency of a welding process which employs the conventional welding gun with transformers is, therefore, low.

SUMMARY OF THE INVENTION

It is an object of the present invention to provide a welding gun assembly with a plurality of transformers, which are arranged to reduce the size of a holder that houses the welding gun, can easily be handled, and can effect efficient welding operation.

Another object of the present invention is to provide welding gun assembly comprising an array of transformers extending in one direction, the transformers having respective secondary coils, a welding gun having a pair of electrodes for sandwiching a workpiece to be welded, a plurality of terminal plates connected to the secondary coils, a plurality of center tap terminal pates connected to intermediate portions of the secondary coils, a first conductor plate extending along the array and interconnecting the terminal plates, the first conductor plate being connected to one of the electrodes of the welding gun, and a second conductor plate extending along the array and interconnecting the center tap terminal plates, the second conductor plate being connected to the other electrodes of the welding gun.

Still another object of the present invention is to provide the welding gun assembly further including rectifiers connected between the secondary coils and the terminal plates.

Yet another object of the present invention is to provide the welding assembly wherein the first and second conductor plates have first and second attachment portions, respectively, which extend along the array and to which the respective electrodes of the welding gun are connected.

Yet still another object of the present invention is to provide a welding gun assembly comprising an array of transformers extending in one direction, the transformers having respective secondary coils, a welding gun having a pair of electrodes for sandwiching a workpiece to be welded, a terminal plate extending along the array and interconnecting the secondary coils, the terminal pate being connected to one of the electrodes of the welding gun, a plurality of center tap terminal plates connected to intermediate portions of the secondary coils, and a conductor plate extending along the array and interconnecting the center tap terminal plates, the conductor plate being connected to the other electrodes of the welding gun.

A further object of the present invention is to provide the welding gun assembly wherein the terminal plate and conductor plate have first and second attachment portions, respectively, which extend along the array and to which the respective electrodes of the welding gun are connected.

A still further object of the present invention is to provide a welding gun assembly comprising an array of transformers extending in one direction, the transformers having respective secondary coils, a welding gun having a pair of electrodes for sandwiching a workpiece to be welded, a plurality of terminal plates connected to the secondary coils, a plurality of center tap terminal plates connected to intermediate portions of the secondary coils, a first conductor plate extending along the array and interconnecting the terminal plates, a second conductor plate extending along the array and interconnecting the center tap terminal plates, a first conductor having one end connected to one end of the first conductor plate along the array and the other end connected to one of the electrodes of the welding gun, and a second conductor having one end connected to an opposite end of the second conductor plate along the array and the other end connected to the other electrode of the welding gun.

A yet further object of the present invention is to provide a welding gun assembly comprising an array of transformers extending in one direction, the transformers having respective secondary coils, a welding gun having a pair of electrodes for sandwiching a workpiece to be welded, a plurality of terminal plates connected to the secondary coils, a plurality of center tap terminal plates connected to intermediate portions of the secondary coils, a first conductor plate extending along the array and interconnecting the terminal plates, a second conductor plate extending along the array and interconnecting the center tap terminal plates, a first conductor having one end connected to an intermediate portion of the first conductor plate along the array and the other end connected to one of the electrodes of the welding gun, and a second conductor having one end connected to an intermediate portion of the second conductor plate along the array and the other end connected to the other electrode of the welding gun.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a schematic diagram of an equivalent circuit of the welding gun assembly according to the third embodiment of the present invention;

FIG. 11 is a front elevational view, partly broken away, of a welding gun assembly with transformers according to a fourth embodiment of the present invention, the welding gun assembly being housed in a holder; and FIG. 12 is a schematic diagram of an equivalent circuit of the welding gun assembly according to the fourth embodiment of the present invention.

DETAILED DESCRIPTION OF THE PREFERRED EMBODIMENTS

Figure 1:
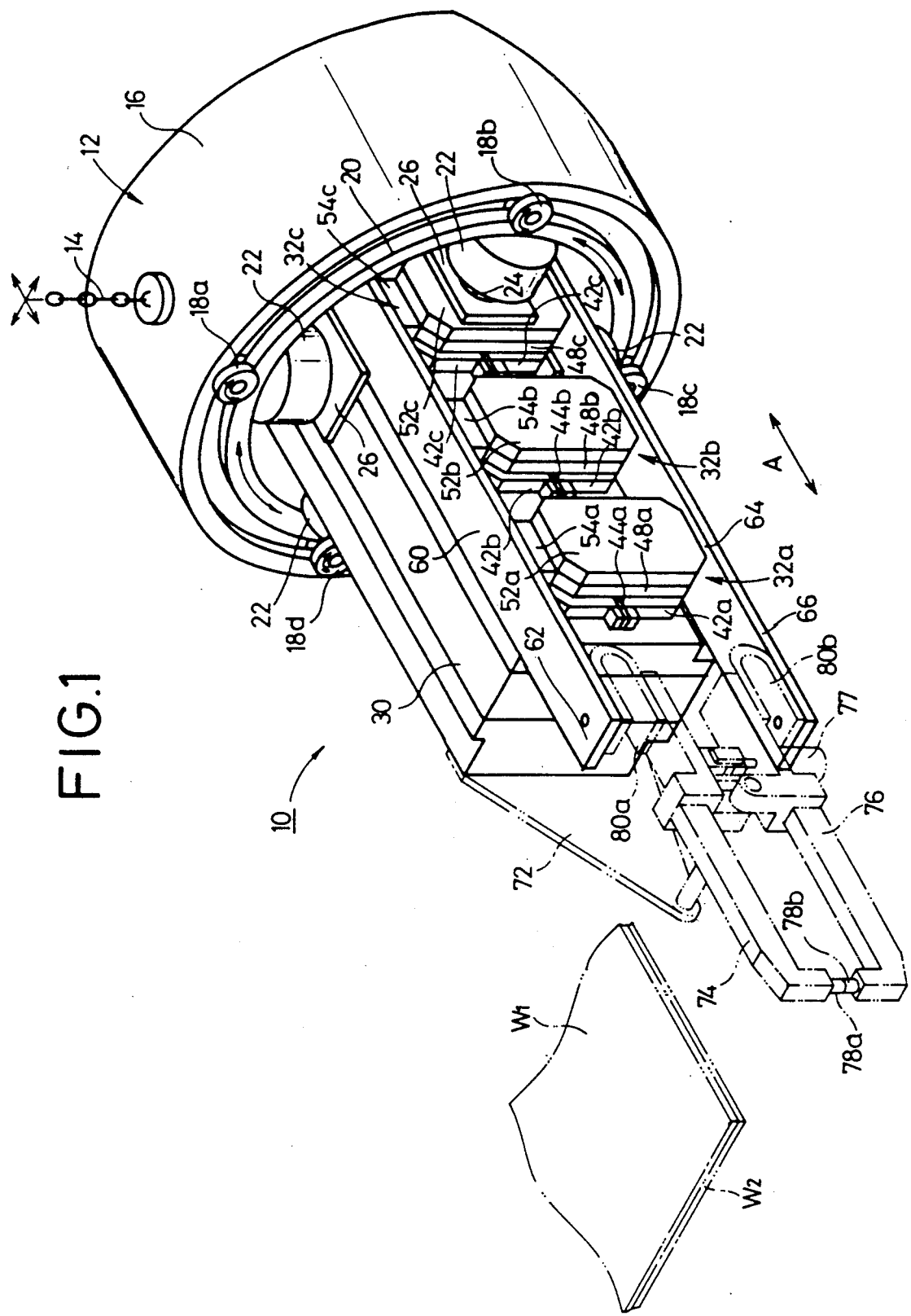
FIG. 1 is a perspective view of a welding gun assembly with transformers according to a first embodiment of the present invention, the welding gun assembly being housed in a holder.
Figure 2:
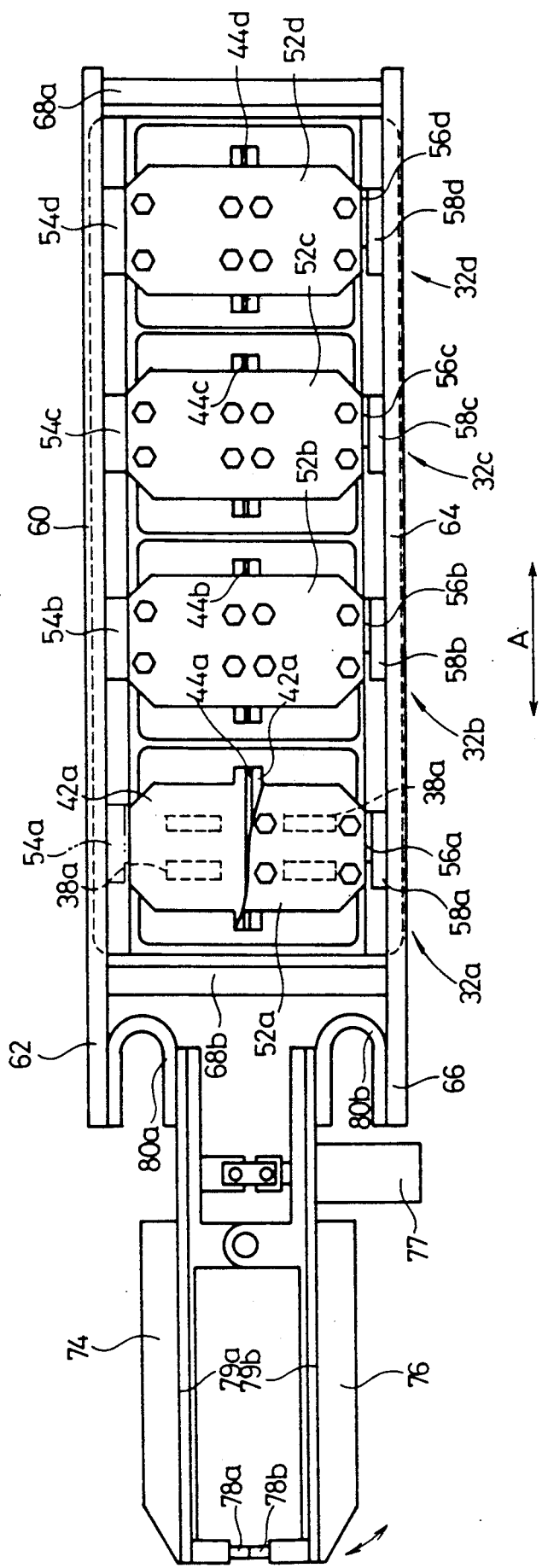
FIG. 2 is a front elevational view, partly broken away, of the welding gun assembly shown in FIG. 1.
Figure 3:
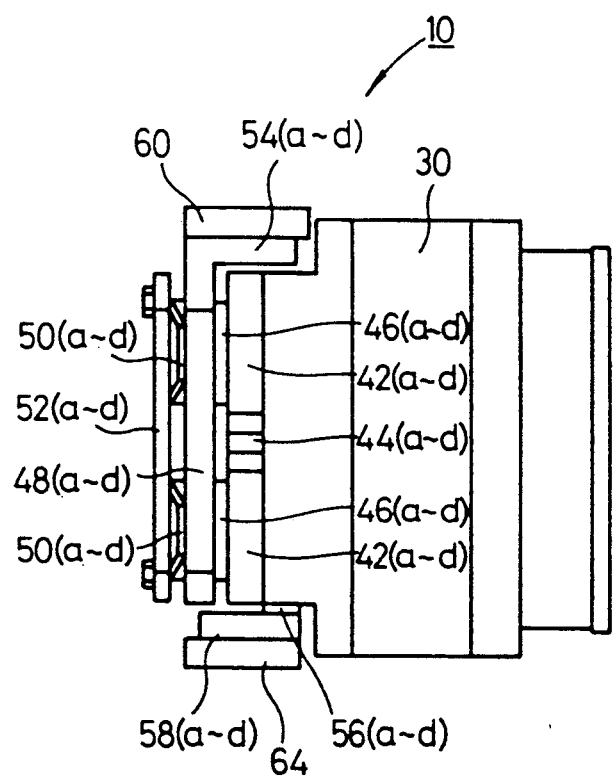
FIG. 3 is a side elevational view of the welding gun assembly shown in FIG. 1.

As shown in FIGS. 1 through 3, a welding gun assembly 10 with transformers according to a first embodiment of the present invention is rotatably supported in a tubular holder 12. The holder 12 includes a cylindrical member 16 suspended by a chain 14 whose upper end is coupled to a movable pulley block (not shown). The cylindrical member 16 can be moved in the directions indicated by the arrows. Four angularly spaced guide rollers 18a through 18d are rotatably supported on the cylindrical member 16 at position equally spaced from the central axis of the cylindrical member 16. A rotary tubular body 20 is rotatably supported by the guide rollers 18a through 18d. Four mount bases 22, serving as holding means, are fixed to the inner peripheral surface of the rotary tubular body 20. Holder members 26 are securely joined to respective rods 24 which extend radially inwardly respectively from the mount bases 22 toward the central axis of the rotary tubular body 20. The welding gun assembly 10 is supported at four positions by the holder members 26.

The welding gun assembly 10 has an elongate casing 30 and includes a linear array of four transformers 32a through 32d oriented in on direction (indicated by the arrow A) and housed in the casing 30.

The transformer 32a has a pair of secondary coils 38a, a pair of secondary electrode plates 42a joined to the opposite ends of the secondary coils 38a, and an insulating member 44a disposed between the secondary electrode plates 42a. A terminal plate 48a is securely joined to the secondary electrode plates 42a through a pair of rectifiers 46a. A pair of Belleville springs 50a is held against the terminal plate 48a in alignment with the respective rectifiers 46a. An iron plate 52a is also held in contact with the springs 50a. The iron plate 52a, the terminal plate 48a, and the secondary electrode plates 42a are fastened together by bolts or the like (see FIG. 3). The terminal plate 48a has a connector 54a extending outwardly and bent over a transverse side of the casing 30.

A center tap terminal plate 56a extends integrally from intermediate portions of the secondary coils 38a, and has on its outer end a connector 58a bent over an opposite transverse side of the casing 30.

The other transformers 32b through 32d are of the same construction as that of the transformer 32a. Those parts of the transformers 32b through 32d which are identical to those of the transformer 32a are denoted by identical reference numerals with suffixes b, c, and d, respectively, and will not be described in detail.

A first conductor plate 60 is integrally coupled to the connectors 54a through 54d of the terminal plates 48a through 48d. The first conductor plate 60 is in the form of a slender strip longer than the casing 30 and extends along one transverse side of the casing 30. The first conductor plate 60 has a first attachment end portion 62 extending a certain length outwardly from one longitudinal end of the casing 30. A second conductor plate 64 is disposed on the other transverse side of the casing 30 and extends parallel to the first conductor plate 60. The second conductor plate 64 is integrally coupled to the connectors 58a through 58d of the center tap terminal plates 56a through 56d. The second conductor plate 64 is also in the form of a slender strip longer than the casing 30 and has a second attachment end portion 66 extending a certain length outwardly from the longitudinal end of the casing 30 in alignment with the first attachment end portion 62 of the first conductor plate 60. The first and second conductor plates 60, 64 are integrally joined to each other at opposite ends thereof by connector bars 68a, 68b (FIG. 2) which are made of a nonconductive material.

A bracket 72 is fixed to the casing 30. A fixed gun arm 74 is connected to the bracket 72, and a movable gun arm 76 is swingably supported on the bracket 72 through a cylinder 70. Electrodes 78a, 78b are attached respectively to distal ends of the fixed and movable gun arms 74, 76 in confronting relation to each other.

As shown in FIG. 2, a conductor 79a is connected to the electrode 78a. A multilayer-strip copper plate 80a has one end connected to the conductor 79a and the other end connected to the first attachment end portion 62 of the first conductor plate 60, which serves as a positive electrode. A conductor 79b is connected to the electrode 78b. A multilayer-strip copper plate 80b has one end connected to the conductor 79b and the other end connected to the first attachment end portion 66 of the second conductor plate 64, which serves as a negative electrode.

The welding gun assembly 10 with transformers according to the first embodiment is basically constructed as described above. Operation and advantages of the welding gun assembly 10 will now be described below.

Two workpieces W1, W2 are combined with each other such that regions thereof to be welded together are superposed on each other. The operator then displaces the holder 12 to displace the welding gun assembly 10 to the regions to be welded of the workpieces W1, W2. Specifically, the operator pulls the cylindrical member 16 in a desired direction and rotates the rotary tubular body 20 through a desired angle while they are being guided by the guide rollers 18a through 18d, until the welding gun assembly 10 is positioned with respect to the workpieces W1, W2.

Then, the cylinder 77 is actuated to angularly displace the movable gun arm 76 toward the fixed gun arm 74, thereby causing the electrodes 78a, 78b on the gun arms 74, 76 to grip the workpieces W1, W2. An AC power supply (not shown) is energized to produce a high-frequency alternating current, which flows from the primary coils (not shown) of the transformers 32a through 32d to the secondary coils 38a through 38d thereof. The alternating currents form the secondary coils 38a through 38d are rectified, in a single-phase full-wave rectification mode, by the rectifiers 46a through 46d connected to the opposite ends of the secondary coils 38a through 38d. The rectified currents then flow from the connectors 54a through 54d of the terminal plates 48a through 48d to the first conductor 60 where the currents are added together into a welding current. The welding current flows between the electrode 78a which is electrically connected to the first attachment end portion 62 of the first conductor plate 60 and the electrode 78b which is electrically connected to the connectors 58a through 58d of the center tap terminal plates 56a through 56d through the second conductor plate 64. The regions to be welded of the workpieces W1, W2 are now fused and welded to each other by the welding current flowing therethrough.

In the illustrated embodiment, the four transformers 32a through 32d are supported on the casing 30 as a linear array extending in the direction indicated by the arrow A. The terminal plates 48a through 48d and center tap terminal plates 56a through 56d of the transformers 32a through 32d are integrally connected to the first and second conductor plates 60, 64 which extend parallel to each other in the direction indicated by the arrow A, and the electrodes 78a, 78b are electrically connected to the first and second attachment end portions 62, 66 of the first and second conductor plates 60, 64. Therefore, the holder members 26 of the holder 12, to which the welding gun assembly 10 is installed, are required to be spaced from each other by a distance which is only large enough to accommodate a single transformer therein. Accordingly, the diameter of the rotary tubular body 20 in which the assembly welding gun 10 with the four transformers 32a through 32d is rotatably supported may be reduced as much as possible, and hence the holder 12 may be rendered compact in its entirety.

If the four transformers were arranged in a vertical matrix, as with the conventional welding gun, then the holder members 26 would have to be spaced wide enough to accommodate the combined dimensions of the four transformers. According to the present invention, however, the diameter of the holder 12 is much smaller than the conventional holder. Since the holder 12 is compact, it can easily be handled by the operator for easier and more efficient welding operation.

In the welding gun assembly 10, the transformers 32a through 32d are linearly arrayed in the direction indicated by the arrow A, i.e., in the axial direction of the holder 12. Consequently, even if more transformers are employed, the diameter of the holder 12 is not increased.

Figure 4:
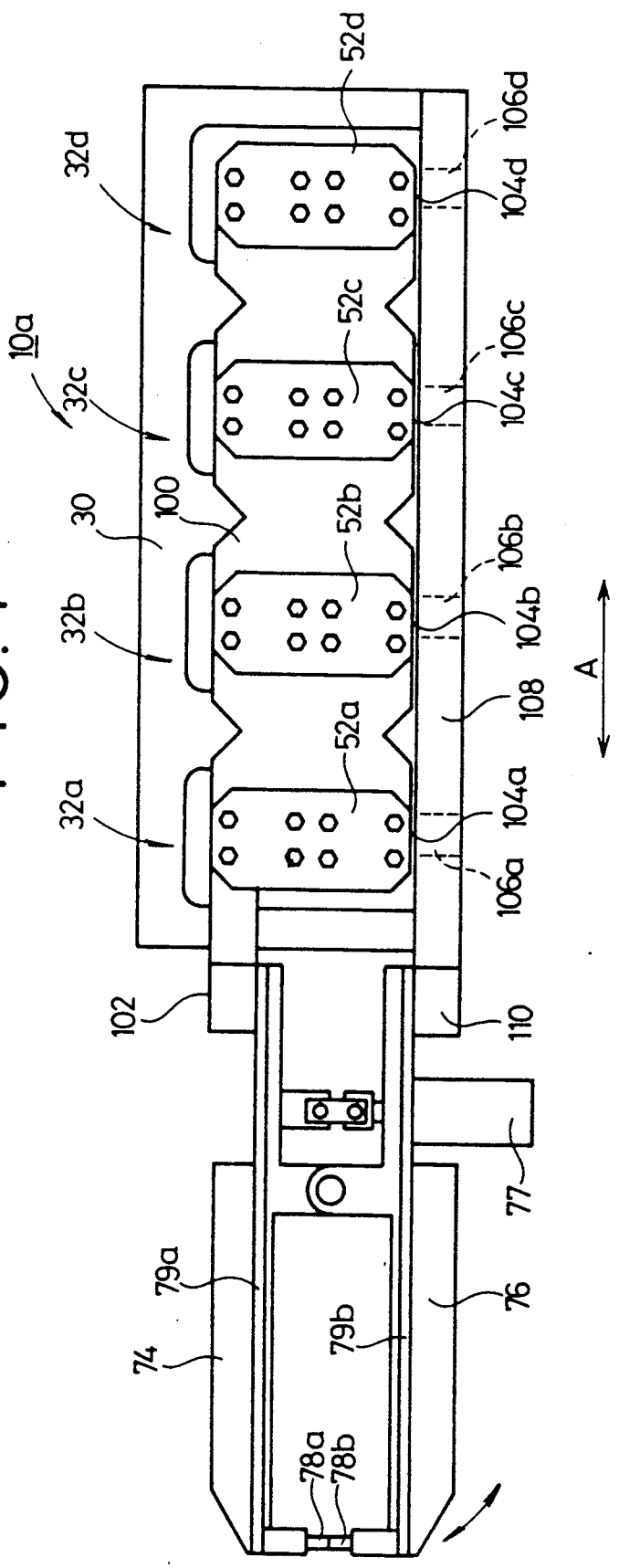
FIG. 4 is a front elevational view of a welding gun assembly with transformers according to a second embodiment of the present invention.
Figure 5:
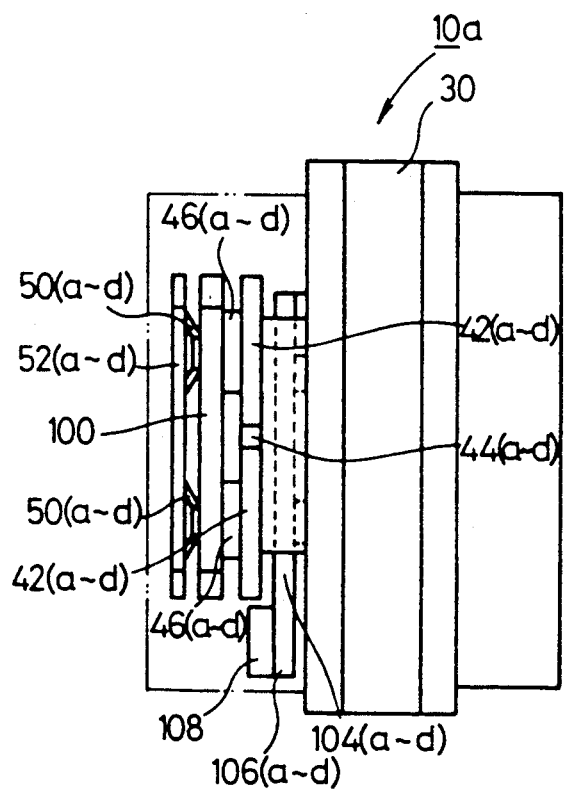
FIG. 5 is a side elevational view of the welding gun assembly illustrated in FIG. 4.

A welding gun assembly with transformers according to a second embodiment of the present invention is shown in FIGS. 4 and 5. Those components shown in FIGS. 4 and 5 which are identical to those of the welding gun assembly according to the first embodiment are designated by identical reference numerals, and will not be described in detail.

The welding gun assembly, generally denoted at 10a, employs a single terminal plate 100 instead of the plural terminal plates 48a through 48d of the first embodiment. The single terminal plate 100 extends in the direction indicated by the arrow A, and is integrally connected to the transformers 32a through 32d. The terminal plate 100 has an integral first attachment end portion 102 projecting outwardly beyond one end of the casing 30.

Center tap terminal plates 104a through 104d extend from the intermediate portions of the secondary coils and have respective connectors 106a through 106d on their outer ends. A conductor plate 108 is integrally joined to the connectors 106a through 106d. The connector plate 108 extends parallel to the terminal plate 100, and has a second attachment end portion 110 projecting outwardly beyond the end of the casing 30. The electrodes 78a, 78b on the gun arms 74, 76 are electrically connected to the first and second attachment end portions 102, 110.

The welding gun assembly 10a according to the second embodiment can also be supported in the holder 12 shown in FIG. 1, and offer the same advantages as those of the welding gun assembly 10 according to the first embodiment.

Figure 6:
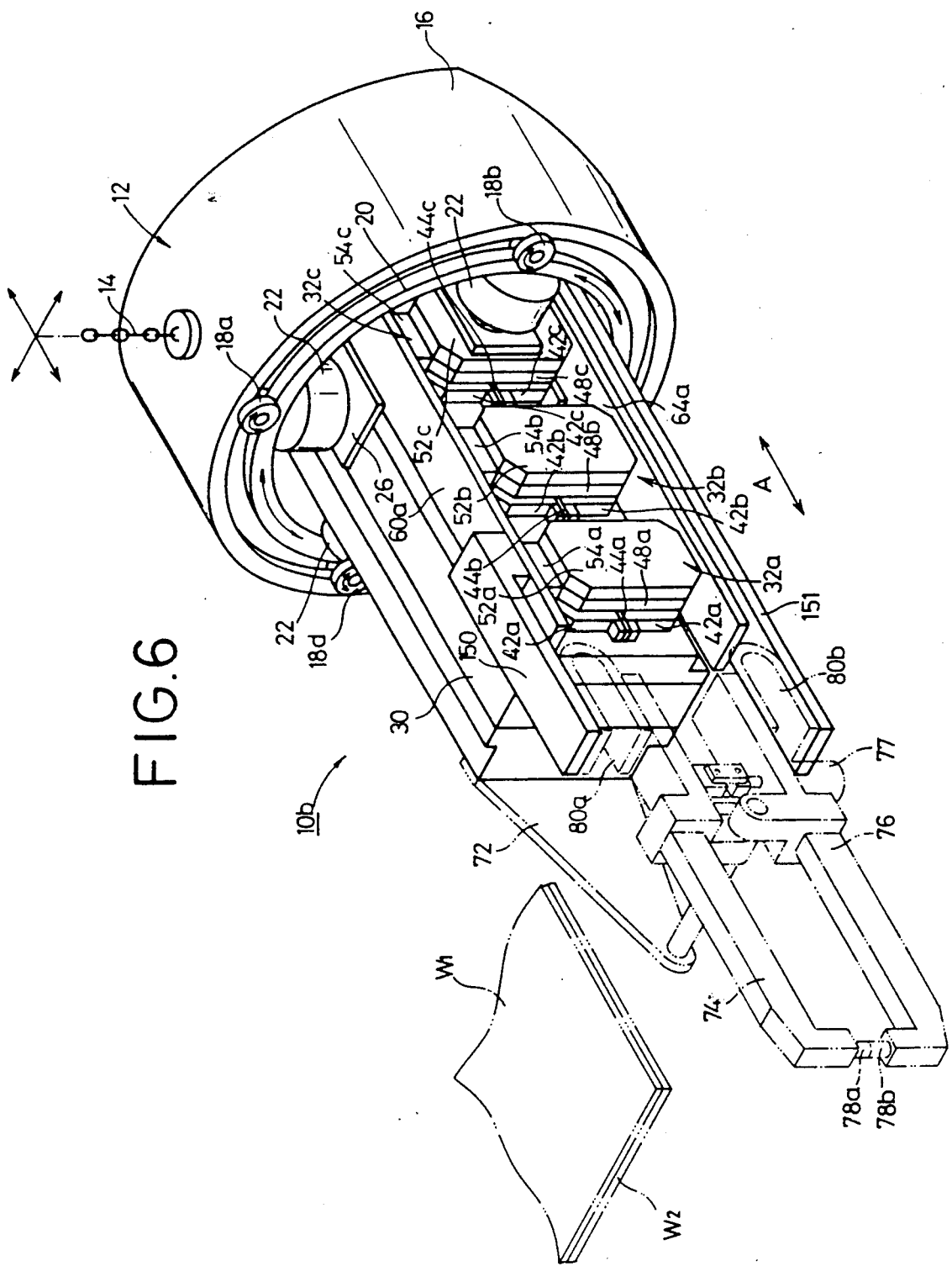
FIG. 6 is a perspective view of a welding gun assembly with transformers according to a third embodiment of the present invention, the welding gun assembly being housed in a holder.
Figure 7:
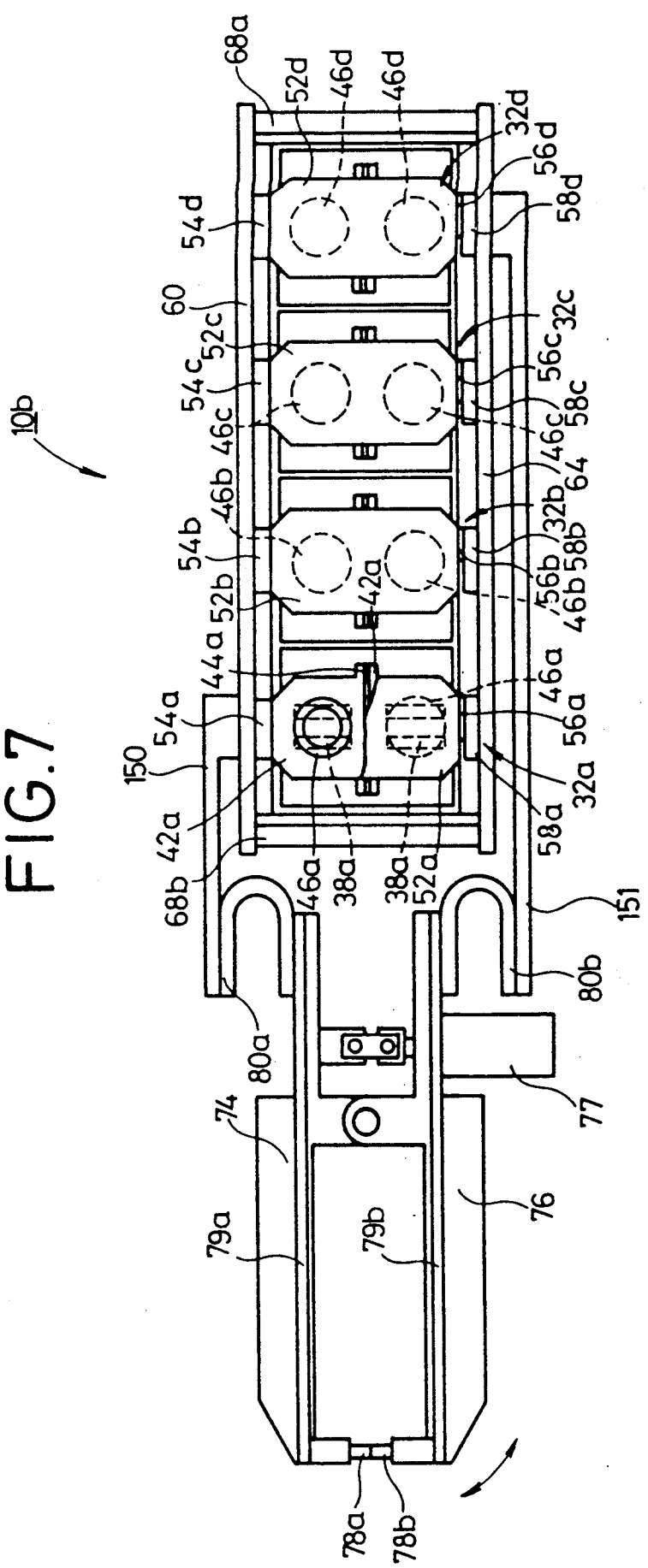
FIG. 7 is a front elevational view, partly broken away, of the welding gun assembly shown in FIG. 6.
Figure 8:
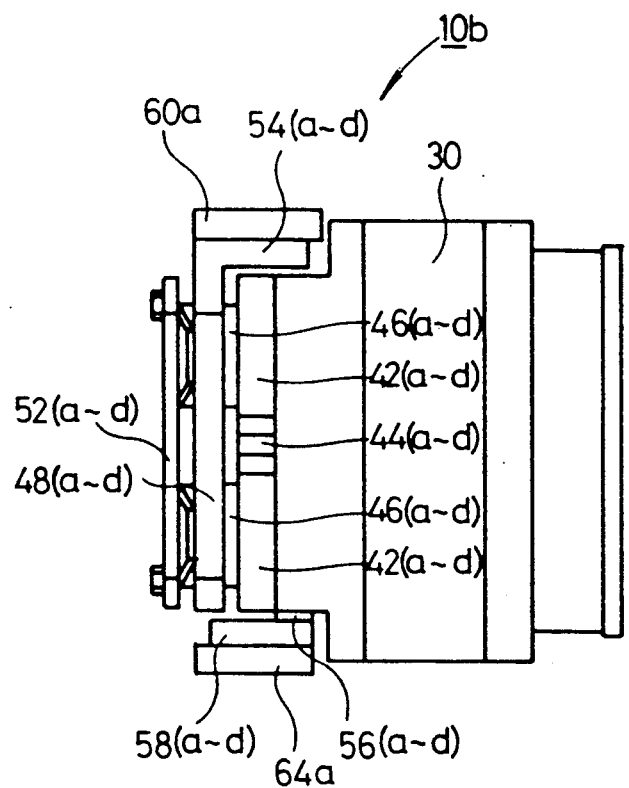
FIG. 8 is a side elevational view of the welding gun assembly shown in FIG. 6.

FIGS. 6 through 8 show a welding gun assembly with transformers according to a third embodiment of the present invention. Those components shown in FIGS. 6 through 8 which are identical to those of the welding gun assembly according to the first embodiment are designated by identical reference numerals, and will not be described in detail.

The welding gun assembly, generally denoted at 10b, has first and second conductor plates 60a, 64a integrally connected to the terminal plates 48a through 48d and center tap terminal plates 56a through 56d of the transformers 32a through 32d that are linearly arrayed in the direction indicated by the arrow A. A first conductor 150 is joined to one longitudinal end of the first conductor plate 60a along the transformer array, whereas a second conductor 151 is connected to an opposite longitudinal end of the second conductor plate 64a along the transformer array. The electrodes 78a, 78b on the gun arms 74, 76 are electrically connected to the first and second conductors 150, 151 respectively through the multilayer-strip copper plates 80a, 80b and the conductors 79a, 79b.

Figure 9:
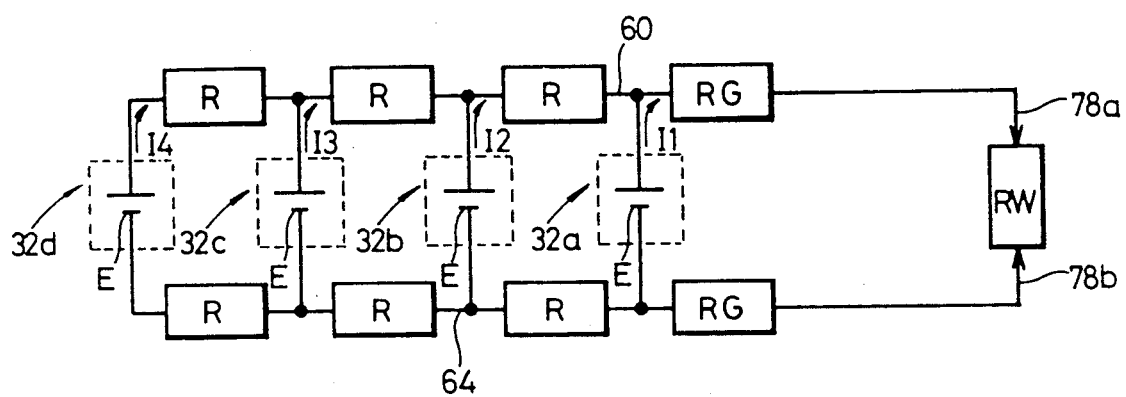
FIG. 9 is a schematic diagram of an equivalent circuit of the welding gun assembly according to the first embodiment of the present invention.

With the welding gun assembly 10, currents supplied from the transformers 32a through 32d are uniformized. Such current uniformization will be described below with reference to FIGS. 9 through 10. FIG. 9 shows an equivalent circuit of the welding gun assembly 10 according to the first embodiment. The transformers 32a through 32d and the first and second terminal plates 60, 64 present resistances R, the first and second terminal plates 60, 64 and the electrodes 78a, 78b present resistances RG, and the workpieces W1, W2 between the electrodes 78a, 78b present a resistance RW.

Currents I1 through I4 supplied from the transformers 32a, 32d are roughly represented by the following equations:

$$I1 = E/(RW + 2RG)$$
$$I2 = E/(2R + RW + 2RG)$$
$$I3 = E/(4R + RW + 2RG)$$
$$I4 = E/(6R + RW + 2RG)$$

where E is the voltage across each of the transformers 32a through 32d. Therefore, these currents are of the relationship: I1<I2<I3<I4.

FIG. 10 shows an equivalent circuit of the welding gun assembly 10b according to the third embodiment. In the welding gun assembly 10b, it can be assumed that resistances of the same value (3R+2RG+RW) exist between the transformers 32a through 32d and the electrodes 78a, 78b. Therefore, the transformers 32a through 32d supply currents I of the same value represented as follows:

$$I = E/(3R + 2RG + RW)$$

Therefore, according to the third embodiment, the transformers 32a through 32d may be of the same capacity, which is far more economical than would be if the transformers 32a through 32d were of different capacities. Moreover, the transformers 32a through 32d can be utilized to its best efficiently and may be reduced in size, making the entire welding gun assembly 10b light in weight and small in size.

FIGS. 11 and 12 illustrate a welding gun assembly with transformers according to a fourth embodiment of the present invention. Those components shown in FIGS. 11 and 12 which are identical to those of the welding gun assembly according to the first embodiment are designated by identical reference numerals, and will not be described in detail.

The welding gun assembly, generally denoted at 10c, includes a first conductor 202 having one end connected to an intermediate portion of the first conductor plate 60a along the transformer array and the other end connected to the electrode 78a, and a second conductor 204 connected to an intermediate portion of the second conductor plate 64a along the transformer array and the other end connected to the electrode 78b.

As shown in FIG. 12, currents Ia, Ib, represented below, are supplied respectively from the transformers 32a, 32d and the transformers 32b, 32c.

$$Ia = E/(3R + 2RG + RW)$$

$$Ib = E/(R + 2RG + RW)$$

Therefore, the transformers 32a through 32d may be of the same capacity. The welding gun assembly 10c offers the same advantages as those of the welding gun assembly 10b according to the third embodiment.

With the present invention, as described above, the transformers are arranged in a linear array extending in one direction, so that the holder which supports the welding gun assembly is reduced in size. Since the operator can handle the small-size holder with greater ease, the welding process can easily and efficiently be carried out. Even if a large number of transformers are employed, since they are arranged in a linear array, the holder is not increased in size. The plural transformers can reliably supply a large current for welding thicker or plated steel workpieces.

In another embodiment, the terminal plates connected to the secondary coils of the transformers are connected by the first conductor plate extending along the transformer array and having one longitudinal end connected to the first conductor, and the center tap terminal plates extending from the intermediate portions of the secondary coils are connected by the second conductor plate extending along the transformer array and having an opposite longitudinal end connected to the second conductor. Accordingly, the resistances between the transformers and the electrodes are constructed to be uniform so that currents supplied from the transformers are prevented from varying from each other. A large welding current can thus be supplied efficiently from the transformers of the same capacity. As the transformers are not increased in size, the welding gun assembly as a whole is light in weight and small in size.

In still another embodiment, the first conductor is connected to the intermediate portion of the first conductor plate along the transformer array, and the second conductor is also connected to the intermediate portion of the second conductor plate along the transformer array. Therefore, currents of substantially the same value are supplied from the transformers to the electrodes, so that the transformers are utilized to their best efficiency.

Although certain preferred embodiments have been shown and described, it should be understood that many changes and modifications ma be made therein without departing from the scope of the appended claims.

We claim:

1. A welding gun assembly comprising:
    a linear array of transformers extending in one direction, said transformers having respective secondary coils;
    a welding gun having a pair of electrodes for sandwiching a workpiece to be welded, said welding gun being fixed at one end of said linear array;
    a plurality of terminal plates connected to said secondary coils;
    a plurality of center tap terminal plates connected to intermediate portions of said secondary coils;
    a first conductor plate extending along said linear array and interconnecting said terminal plates, said first conductor plate being connected to one of said electrodes of the welding gun; and
    a second conductor plate extending along said linear array and interconnecting said center tap terminal plates, said second conductor plate being connected to the other electrode of the welding gun.

2. A welding gun assembly according to claim 1, further including rectifiers connected between said secondary coils and said terminal plates.

3. A welding gun assembly according to claim 1, wherein said first and second conductor plates have first and second attachment portions, respectively, which extend along said array linear and to which the respective electrodes of said welding gun are connected.

4. A welding gun assembly comprising:
- a linear array of transformers extending in one direction, said transformers having respective secondary coils;
- a welding gun having a pair of electrodes for sandwiching a workpiece to be welded, said welding gun being fixed at one end of said linear array;
- a terminal plate extending along said linear array and interconnecting said secondary coils, said terminal plate being connected to one of said electrodes of the welding gun;
- a plurality of center tap terminal plates connected to intermediate portions of said secondary coils; and
- a conductor plate extending along said linear array and interconnecting said center tap terminal plates, said conductor plate being connected to the other electrode of the welding gun.

5. A welding gun assembly according to claim 4, further including rectifiers connected between said secondary coils and said terminal plate.

6. A welding gun assembly according to claim 4, wherein said terminal plate and conductor plate have first and second attachment portions, respectively, which extend along said linear array and to which the respective electrodes of said welding gun are connected.

7. A welding gun assembly comprising:
- a linear array of transformers extending in one direction, said transformers having respective secondary coils;
- a welding gun having a pair of electrodes for sandwiching a workpiece to be welded, said welding gun being fixed at one end of said linear array;
- a plurality of terminal plates connected to said secondary coils;
- a plurality of center tap terminal plates connected to intermediate portions of said secondary coils;
- a first conductor plate extending along said linear array and interconnecting said terminal plates;
- a second conductor plate extending along said linear array and interconnecting said center tap terminal plates;
- a first conductor having first and second ends, said first end connected to one end of said first conductor plate along said linear array and said second end connected to one of said electrodes of the welding gun; and
- a second conductor having first and second ends, said first end connected to an opposite end of said second conductor plate along said linear array and said second end connected to the other electrode of the welding gun;
- wherein said first end of said first conductor and said first end of said second conductor are disposed respectively at opposite ends of said linear array.

8. A welding gun assembly according to claim 7, further including rectifiers connected between said secondary coils and said terminal plates.

9. A welding gun assembly comprising:
- a linear array of transformers extending in one direction, said transformers having respective secondary coils;
- a welding gun having a pair of electrodes for sandwiching a workpiece to be welded, said welding gun being fixed at one end of said linear array;
- a plurality of terminal plates connected to said secondary coils;
- a plurality of center tap terminal plates connected to intermediate portions of said secondary coils;
- a first conductor plate extending along said linear array and interconnecting said terminal plates;
- a second conductor plate extending along said linear array and interconnecting said center tap terminal plates;
- a first conductor having first and second ends, said first end connected to an intermediate portion of said first conductor plate along said linear array and said second end connected to one of said electrodes of the welding gun; and
- a second conductor having first and second ends, said first end connected to an intermediate portion of said second conductor plate along said linear array and said second end connected to the other electrode of the welding gun.

10. A welding gun assembly according to claim 9, further including rectifiers connected between said secondary coils and said terminal plates.

* * * * *

UNITED STATES PATENT AND TRADEMARK OFFICE
CERTIFICATE OF CORRECTION

PATENT NO. : 5,053,599

DATED : October 1, 1991

INVENTOR(S) : Gen TSUJII and Fumitomo TAKANO

It is certified that error appears in the above-identified patent and that said Letters Patent is hereby corrected as shown below:

On the title page:      [30]   Foreign Application Priority Data, after

"May 15, 1989 [JP] Japan ........ 1-121832" insert

-- April 24, 1990 [JP] Japan ......... 2-107782 --

Signed and Sealed this

Sixteenth Day of February, 1993

*Attest:*

STEPHEN G. KUNIN

*Attesting Officer*    *Acting Commissioner of Patents and Trademarks*